United States Patent [19] [11] Patent Number: 5,786,591
Asahi [45] Date of Patent: Jul. 28, 1998

[54] OPTICAL FILTER WITH TRANSMISSION WAVELENGTH BAND CONTROLLING FUNCTION AND RECEIVER USING THE OPTICAL FILTER

[75] Inventor: Koji Asahi, Tokyo, Japan

[73] Assignee: NEC Corporation, Tokyo, Japan

[21] Appl. No.: 814,869

[22] Filed: Mar. 11, 1997

[30] Foreign Application Priority Data

Mar. 15, 1996 [JP] Japan .................................. 8-087599

[51] Int. Cl.[6] .................................................. G01J 3/50
[52] U.S. Cl. ...................................... 250/226; 359/182
[58] Field of Search .................................. 250/226, 229, 250/237 R, 551; 359/154, 157, 159, 181–186; 348/270–273

[56] References Cited

U.S. PATENT DOCUMENTS

5,686,722 11/1997 Dubois et al. ......................... 250/226

Primary Examiner—Que Le
Attorney, Agent, or Firm—Whitham, Curtis & Whitham

[57] ABSTRACT

The optical filter of the invention has a optical filter section for transmitting only the light having wavelength included in the transmission wavelength band prescribed by the wavelength control signal out of the input signal light and for supplying the transmission wavelength band signal light, a low frequency signal generator, an optical coupler, a photoelectric converter, a specific frequency signal component extractor, a wavelength controller, and a signal superposer. The low frequency signal generator generates a changing signal having a previously prescribed frequency. The optical coupler branches partially the transmission wavelength band signal light through the optical filter and outputs the branched signal light from one terminal. The photoelectric converter converts the branched signal light to an electric signal. The specific frequency signal component extractor extracts the signal component of the changing signal frequency, and outputs a specific frequency signal. The wavelength controller detects the phase and amplitude of the specific frequency signal and outputs a control signal so that the phase and amplitude are adjusted to prescribed values. The superposer superposes the changing signal on the control signal and outputs a wavelength control signal to the above-mentioned optical filter. According to the optical filter of the present invention, the sweeping for wavelength setting in the initial condition is unnecessary, and the optimal condition is attained in a short time. The optimal center wavelength of the transmission wavelength band is always maintained optimal without repeated sweeping for temperature change and change with time. The signal light of a prescribed wavelength channel can be extracted based on a channel selecting signal from the multiplexed signal light.

14 Claims, 8 Drawing Sheets

OPTICAL FILTER WITH TRANSMISSION WAVELENGTH BAND CONTROLLING FUNCTION AND RECEIVER USING THE OPTICAL FILTER

BACKGROUND OF THE INVENTION

1. Field of the Invention

This invention relates to an optical filter which transmits only light of a certain wavelength, and particularly relates to a wavelength multiplex optical transmission receiver provided with an optical filter having a function for controlling transmission wavelength band.

2. Description of Related Art

Wavelength multiplex optical transmission technology has been applied in order to increase the communication capacity in optical communication. It is required to receive a signal light having a certain wavelength and remove the signal light having adjacent wavelength in the apparatus of the receiving side for the wavelength multiplex optical transmission.

The optical filter is a device having a function for transmitting a certain signal light. An optical filter is provided on the step precedent to a light receiving device for converting a signal light to an electric signal in the wavelength multiplex optical transmission.

If the wavelength of a signal light is previously known and the wavelength does not change, then an optical filter which transmits only this wavelength may be used. However the initial wavelength of the signal light can not be generally specified accurately because the initial wavelength of a signal light usually changes dependently on the condition of an optical emitting diode of the transmission side. The signal light changes dependently on the degradation of a light emitting diode or temperature condition after starting of communication. Therefore, the function for controlling the transmission wavelength band is required so that the transmission wavelength band of an optical filter is matched with the wavelength of the signal light of the transmission side. In addition, controlling of the transmission wavelength band is required so as to follow up the change of the wavelength of the signal light.

A variable optical filter which changes and controls transmission wavelength band thereof is used. A conventional optical filter having a function for controlling the transmission wavelength band comprises a variable optical filter which can change the transmission wavelength band, a light receiver which partially branches the transmitted light and detects the light intensity of the branched light, and a wavelength controller which feedback-controls so that the intensity of the branched light detected by the light receiver is maximized and controls the transmission wavelength of the optical filter. A micro-processor is used for wavelength controlling and in the initial condition when power source is turned on, the transmission center wavelength of an optical filter is swept. The wavelength at which the level of a signal light transmission through an optical filter exhibits the maximum is detected, and the center wavelength of the transmission wavelength band of the optical filter is set.

For preventing the wavelength change of the signal light due to temperature change, the lowering of wavelength component level is detected, the center wave-length of the transmission wavelength band of the optical filter is swept in a relatively narrow range, and the center wavelength at which the level is maximized is detected and setting is performed again.

However, a conventional optical filter for controlling the transmission wavelength band requires a long time for sweeping to set the center wavelength of the transmission wavelength band in the initial condition. Because the wavelength is swept again for temperature change and change with time, that is, the center wavelength is set again after deviation from the optimal center wavelength. S/N ratio (signal to noise ratio) deteriorates, and the deterioration is disadvantageous.

SUMMARY OF THE INVENTION

It is the object of the present invention to provide an optical filter with transmission wavelength band controlling function which is capable of setting the optimal wavelength within a short time without sweeping the wavelength in the initial condition. It is the other object of the present invention to provide an optical filter with transmission wavelength band controlling function which is capable of setting always the optimal transmission wavelength band to correct the slight changing of wave-length of signal light due to temperature change.

The optical filter with transmission wavelength band controlling function in accordance with the present invention is provided with a optical filter section for transmitting only the light having wavelength included in the transmission wavelength band prescribed by the wavelength control signal out of the input signal light and for supplying the transmission wavelength band signal light, a low frequency signal generator, an optical coupler, a photoelectric converter, a specific frequency signal component extractor, and a wavelength controller.

The low frequency signal generator generates a changing signal having a previously prescribed frequency. The optical coupler branches partially the transmission wavelength band signal light through the optical filter section and outputs the branched signal light from one terminal. The photoelectric converter converts the branched signal light to an electric signal. The specific frequency signal component extractor extracts the signal component of the changing signal frequency, and supplies a specific frequency signal. The wavelength controller detects the phase and amplitude of the specific frequency signal and supplies a control signal so that the phase and amplitude are adjusted to prescribed values. The optical filter of the present invention is provided additionally with a signal superposer. The superposer superposes the changing signal on the control signal and supplies a wavelength control signal to the above-mentioned optical filter section.

According to the optical filter of the present invention, the sweeping for wavelength setting in the initial condition is unnecessary, and the optimal condition is attained in a short time. The optimal center wavelength of the transmission wavelength band is always maintained without repeated sweeping for temperature change and change with time. The signal light of a prescribed wavelength channel can be extracted based on a channel selecting signal from multiplexed signal light.

An optical filter of the present invention is provided with a photoelectric converter having a light receiving element for receiving the branched signal light and converting it to a current signal and a current/voltage converter for converting the current signal to a voltage signal.

An optical filter of the present invention is provided with a specific frequency signal component extractor having a filter for extracting a voltage signal having a previously prescribed frequency out of the voltage signal.

An optical filter of the present invention is provided with a pulse generator for adding a pulse signal having the same period as the frequency to the changing signal and for supplying the pulsed changing signal to the controller.

An optical filter of the present invention is provided with a wavelength controller having a wavelength range setter for controlling the transmission wavelength band within the previously prescribed wavelength range.

An optical filter of the present invention can involve a wavelength multiplexed signal light that signal lights of a plurality of channels comprising different signal light wavelengths are multiplexed and the wavelength range setter can set a wavelength range based on a channel selecting signal supplied from the outside.

The optical filter section of an optical filter of the present invention may comprise an acousto-optic tunable filter. The acousto-optic tunable filter comprises the first polarization beam splitter for polarizing and splitting the input signal light and for supplying the first polarized and split light, the first polarization converter for polarizing and converting the polarized and split light by way of acousto-optic effect and for supplying a polarized and converted light, the second polarization beam splitter for polarizing and splitting the polarized converted light and supplying the second polarized and split light, the second polarization converter for polarizing and converting the first polarized and split light by way of acousto-optic effect and supplying the second polarized and converted light, a polarization multiplexer for polarization multiplexing the second polarized and converted light, and an electrode for applying a voltage signal based on the wavelength control signal to the first polarization converter and the second polarization converter. The frequency of the above-mentioned voltage signal is set to 170 MHz.

The wavelength controller of an optical filter of the present invention detects the deviation between the center wavelength of the transmission wavelength band of the optical filter section and the center wavelength of a signal light and sets the wavelength control signal so that the deviation between the wavelengths is reduced.

A receiver using an optical filter with transmission wavelength band controlling function of the present invention is provided with the above-mentioned optical filter of the present invention and additionally a receiving section for converting the transmission wavelength band signal light to an electric signal at the other output of the optical coupler.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

First, prior to the description of the structure of an optical filter with transmission wavelength band controlling function in accordance with the present invention, a conventional optical filter is described for easier understanding of the present invention.

Figure 1:
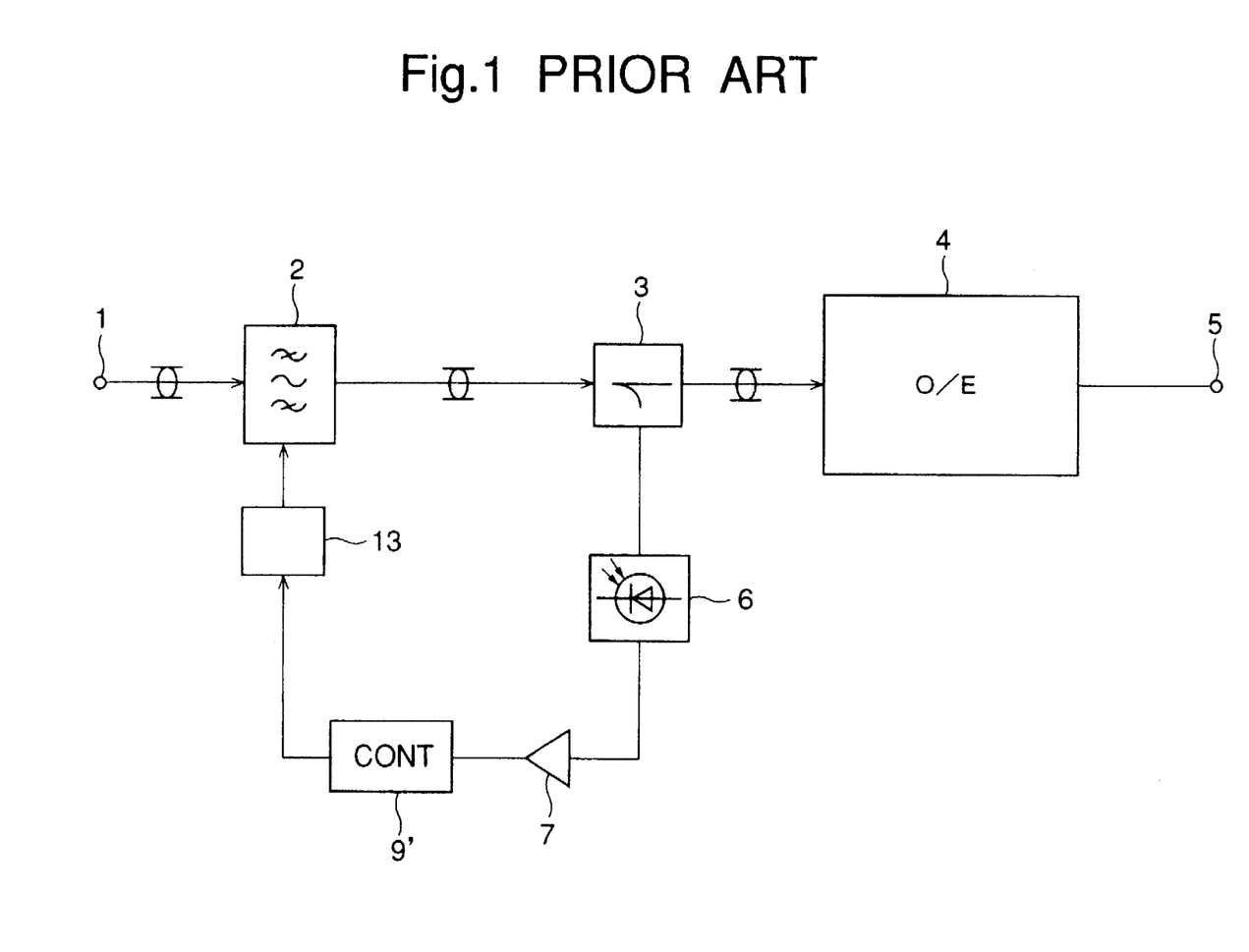
FIG. 1 is a diagram for illustrating the structure of a conventional optical filter with transmission wavelength band controlling function.

FIG. 1 is a diagram for illustrating the structure of an conventional optical filter provided with a function for controlling the transmission wavelength band. In FIG. 1, the signal light supplied from a signal input terminal 1 transmits a variable optical filter 2. The optical filter 2 has a certain transmission wavelength band width and allows the light only included in the transmission wavelength band to transmit. The center wavelength of the transmission wavelength band can be varied by supplying a signal from a driver 13.

The signal light after transmission through the optical filter 2 is supplied to a photoelectric converter 4 as it is and converted to an electric signal. The signal light is partially branched by an optical coupler 3 provided precedent to the photo-electric converter 4. The branched light is received by a light receiving element 6, for example PIN photodiode, and converted to a current signal. The current signal is further converted to a voltage signal by a current/voltage converter 7 and the intensity of the signal light is detected.

The center wavelength of the transmission wavelength band of the optical filter 2 is swept by the driver 13, and the center wavelength is set by the wavelength controller 9' at the maximum wavelength of the above-mentioned detected signal light. In the wavelength controller 9', first the transmission center wavelength of the optical filter 2 is swept by a microprocessor in the initial condition such as the case that an electric power is turned on. The wavelength that maximizes the level of the signal light which transmits through the optical filter 2 is detected, and the center wavelength of the transmission wavelength band of the optical filter is initially set.

The lowering of the wavelength component level due to wavelength change of wavelength of the center wavelength of the transmission wavelength band of the optical filter 2 corresponding to temperature change is detected, the center wavelength of the transmission wavelength band of the optical filter 2 is swept in a relatively narrow range, and the center wavelength that maximize the level is reset again.

However, the conventional optical filter for controlling the transmission wavelength band requires a long time for sweeping to set the center wavelength of the transmission wavelength band in the initial condition. Because the wavelength is swept again for temperature change and change with time, that is, the center wavelength is set again after deviation from the optimal center wavelength. S/N ratio (signal to noise ratio) deteriorates, and the deterioration is disadvantageous.

Next, the structure of an optical filter with transmission wavelength band controlling function in accordance with the present invention is described referring to a drawing.

Figure 2:
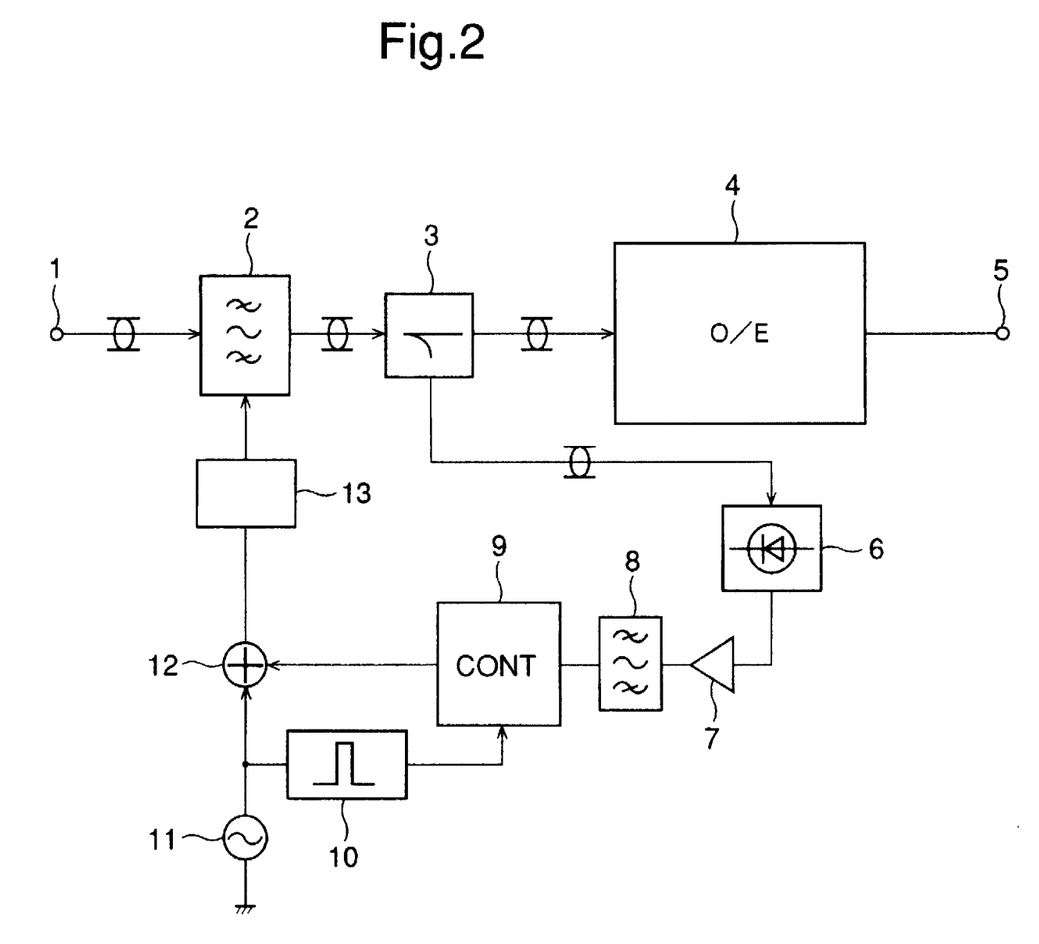
FIG. 2 is a diagram for illustrating the structure of the first embodiment of an optical filter provided with a function for controlling the transmission wavelength band in accordance with the present invention.

FIG. 2 is a diagram for illustrating the structure of the first embodiment of the optical filter with transmission wavelength band controlling function in accordance with the present invention.

The optical filter with transmission wavelength band controlling function in accordance with the present invention is provided with a variable optical filter 2 which is capable of varying the center wavelength of the transmission wavelength band in response to a control signal from the outside, an optical coupler 3 for branching partially the transmitted signal light, and a light receiving element 6 for converting the branched light to a current signal like the conventional optical filter.

In FIG. 2, the signal light supplied from the signal input terminal 1 transmits the optical filter 2. The optical filter 2 has a certain transmission wavelength band width, and allows only light included in the range of transmission wavelength band to transmit. The center wavelength of the transmission wavelength band of the optical filter 2 can be varied in response to a signal supplied from the driver 13.

The signal light that transmitted the optical filter 2 is supplied to a photo-electric converter 4 as it is, and converted to an electric signal. The signal light is partially branched by the optical coupler 3 provided precedent to the photo-electric converter 4. The branched light is received by a light receiving element 6 such as PIN photodiode, and converted to a current signal. The current signal is converted to a voltage signal by a current/voltage converter 7, and the intensity of the signal light is detected.

The optical filter with transmission wavelength band controlling function in accordance with the present invention is different from the conventional optical filter in that the former optical filter is additionally provided with a low frequency signal generator 11, pulse generator 10, and low frequency signal superposer 12.

From a signal branched by the optical coupler 3 and converted to a voltage signal, only a low frequency signal component is extracted by a band pass filter 8. In the wavelength controller 9, phase and amplitude of the low frequency signal component are detected. The center wavelength of the transmission wavelength band of the optical filter 2 is feedback controlled so that the detected phase and amplitude of the low frequency signal component are adjusted to previously set values.

A signal having a prescribed frequency generated from the low frequency signal generator 11, preferably a low frequency signal of several kHz, is superposed therein, and the signal is supplied to the driver 13. The center wavelength of the transmission wavelength band of the optical filter 2 is varied slightly correspondingly to the signal frequency supplied from the low frequency signal generator 11.

In detail, the low frequency signal component extracted by the band pass filter 8 is supplied to the wavelength controller 9. Sample holding is performed in response to the phase at which the low frequency signal is maximized based on the pulse generated by the pulse generator 10 having a certain pulse width having the same period as that of the low frequency signal, and the voltage level (low frequency signal amplitude information) is detected. The driver 13 controls the optical filter 2 so that the voltage value is adjusted to be the optimal point, thereby the center wavelength of the transmission wavelength band of the optical filter 2 coincides with the signal light wavelength always, because the voltage detected by sample holding corresponds to the deviated direction and the degree of deviation between the center wavelength of the transmission band of the optical filter 2 and the signal light wavelength.

Figure 3A:
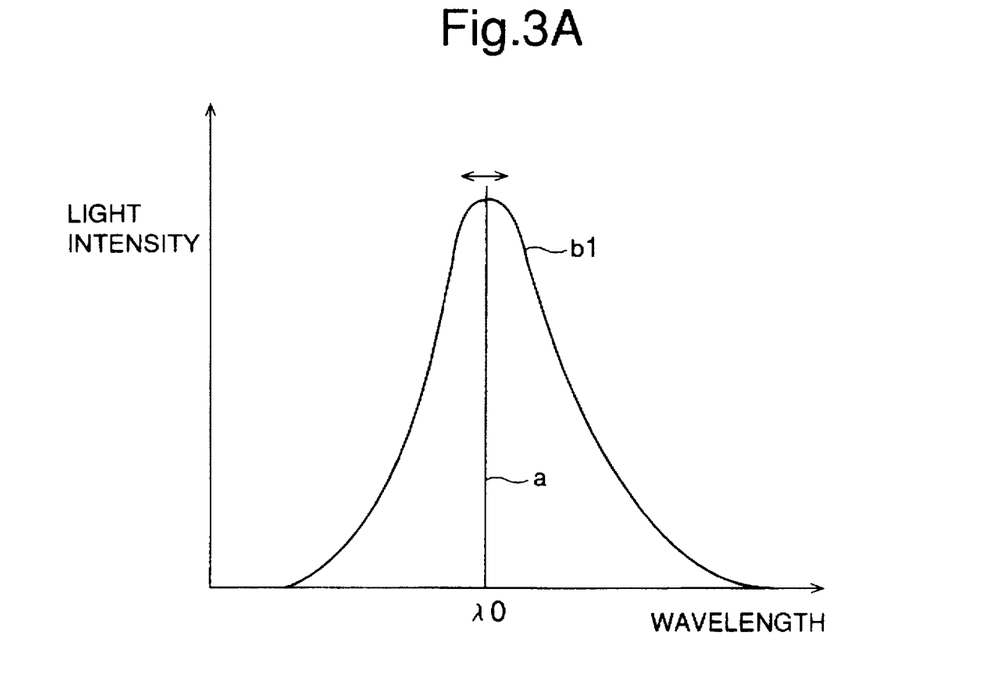
FIGS. 3A and 3B are graphs for describing the principle of the optical filter with transmission wavelength band controlling function in accordance with the present invention.
Figure 3B:
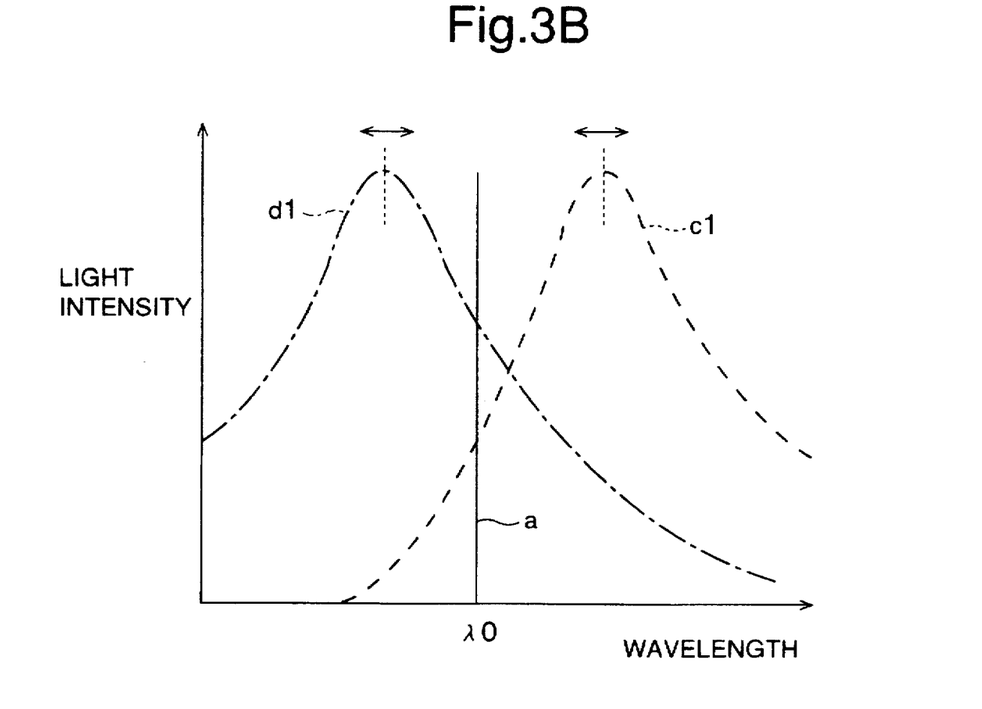

Next, more details of the first embodiment of the optical filter with transmission wavelength band controlling function in accordance with the present invention are described referring to a waveform of the signal light. FIGS. 3A and 3B are graphs for illustrating a waveform of the signal light for describing operations of the optical filter with transmission wavelength band controlling function in accordance with the present invention.

The center wavelength of the transmission wavelength band of the optical filter 2 is located at the optimal point. For the spectrum waveform (refer to FIG. 3A) of a received signal, the received signal waveform (spectrum waveform) coincides with the center wavelength $\lambda 0$ of the transmission wavelength band of the optical filter 2 as shown in FIG. 3(A) as b1 in the wavelength characteristics of the optical filter 2.

Figure 4:
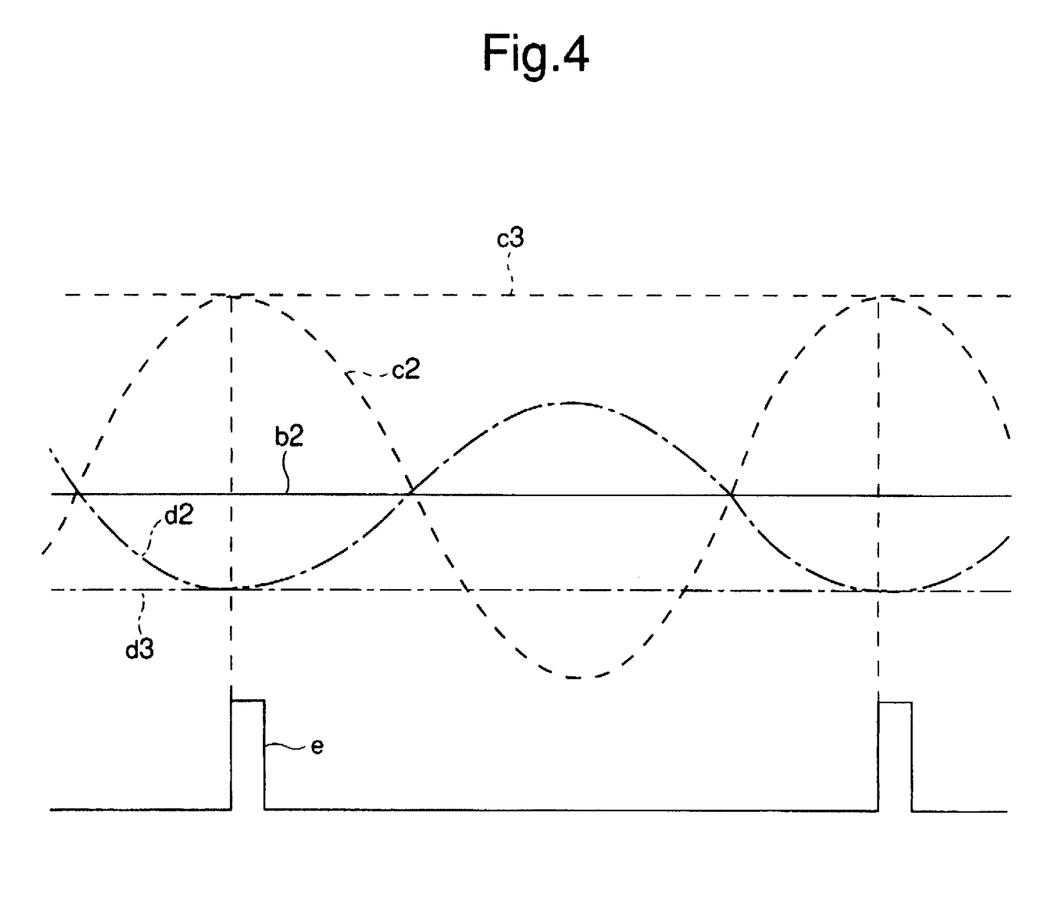
FIG. 4 is a waveform diagram of a signal light for describing operations of the optical filter with transmission wavelength band controlling function in accordance with the present invention.

The slight change of the center wavelength of the optical filter 2 due to the low frequency signal is not extracted by the low pass filter 8, the output signal from the low pass filter 8 has a waveform shown as b2 in FIG. 4.

On the other hand, when the center wavelength of the transmission wavelength band of the optical filter 2 deviates from the wavelength of a received signal light in response to temperature change or change with time, the optical filter 2 has the wavelength characteristics shown as c1 and d1 in FIG. 3B. When, the center wavelength of the transmission wavelength band of the optical filter 2 changes slightly with a period of the low frequency signal. In c1 of FIG. 3(B) which shows the wavelength characteristics, the extracted signal wavelength superposes on the right ascending part of the wavelength characteristics of the optical filter. On the other hand, in d1 of FIG. 3B, the extracted signal wavelength superposes on the right descending part.

The low frequency signal extracted by the band pass filter 8 appears with phase difference of 180 degrees depending on c1 or d1 in FIG. 3B. Further, the low frequency signal appears with waveform difference shown as c2 and d2 in FIG. 4 because the amplitude of the low frequency signal corresponds to the degree of deviation between the center wavelength of the transmission band of the optical filter 2 and the wavelength of the received signal light.

The low frequency signal waveform shown as b2, c2, and d2 in FIG. 4 extracted by the band pass filter 8 is supplied to the wavelength controller 9, and also the pulse generated from the pulse generator 10 with a narrow pulse width and the same period (refer to e in FIG. 4) as that of the low frequency signal is supplied to the wavelength controller 9. The pulse generator 10 generates a pulse based on the output of the low frequency signal generator 11.

The wavelength controller 9 performs phase sample-holding for maximizing the low frequency signal, and a voltage such as b3, c3, or d3 is detected correspondingly to an input signal waveform such as b2, c2, or d2 in FIG. 4 respectively. The voltage detected during sample holding corresponds to the degree and direction of the deviation between the center wavelength of the transmission wavelength band of the optical filter 2 and the wavelength of the signal light. The optical filter 2 is feedback controlled through the driver 13 so that the voltage is optimized, and the optical filter 2 is set so that the center wavelength of the optical filter 2 always coincides with the wavelength of the signal light.

Figure 5:
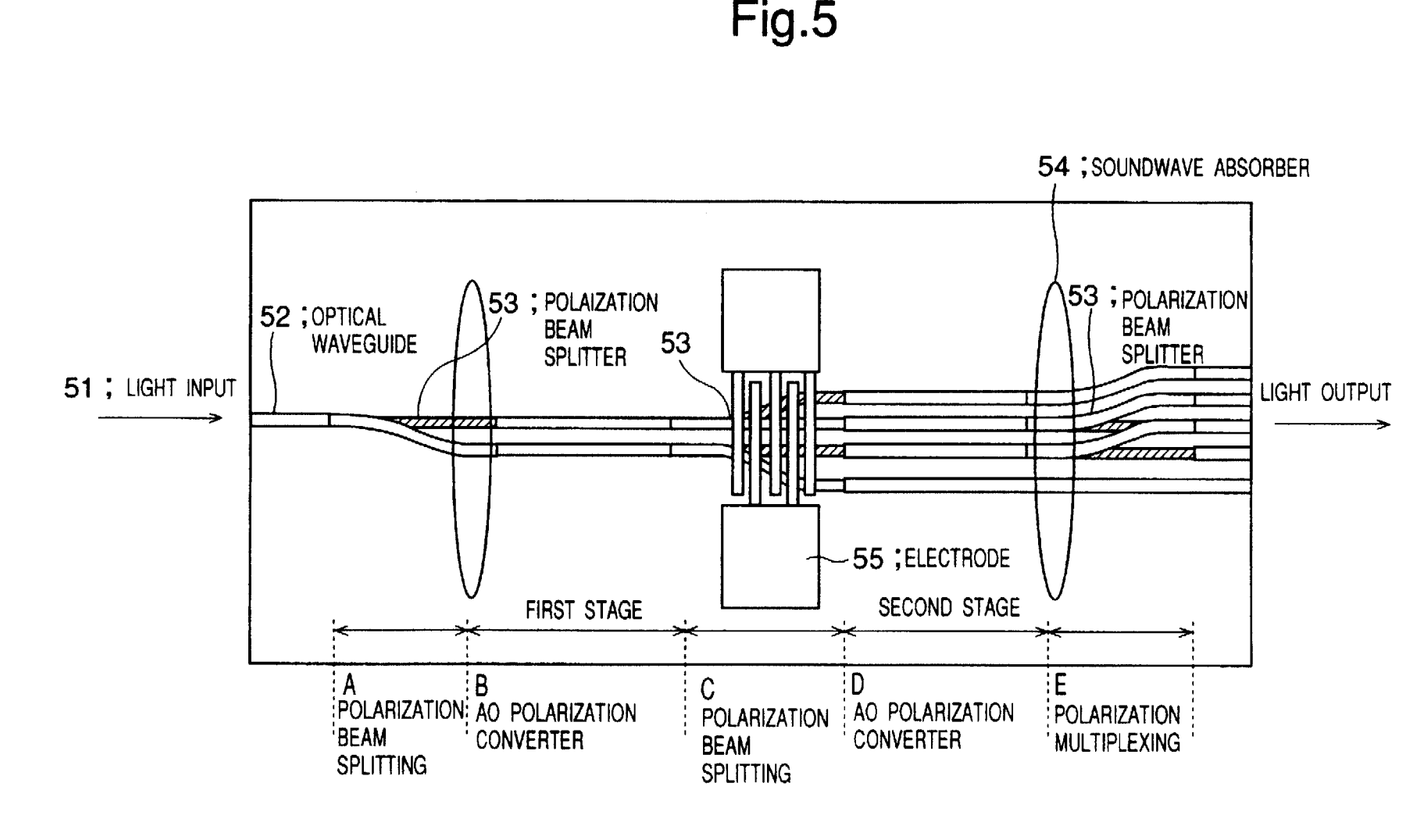
FIG. 5 is a diagram for illustrating an example structure of an optical filter used in the first embodiment of the optical filter with transmission wavelength band controlling function in accordance with the present invention.

In this embodiment, an optical filter 2 that the center wavelength of the transmission wavelength band is changed in response to a control signal from the outside is used. The example of such optical filter includes, for example, acousto-optic tunable filter (referred to as AOTF hereinafter). An AOTF comprises, for example, an optical waveguide 52 formed on a LiNbO3 substrate, polarization beam splitter 53, AO polarization converter, and electrode 55 as shown in FIG. 5. In the AOTF element, the output of wavelength component corresponding to the frequency is obtained by supplying a signal with a frequency of approximately 170 MHz to the electrode 55.

Figure 6:
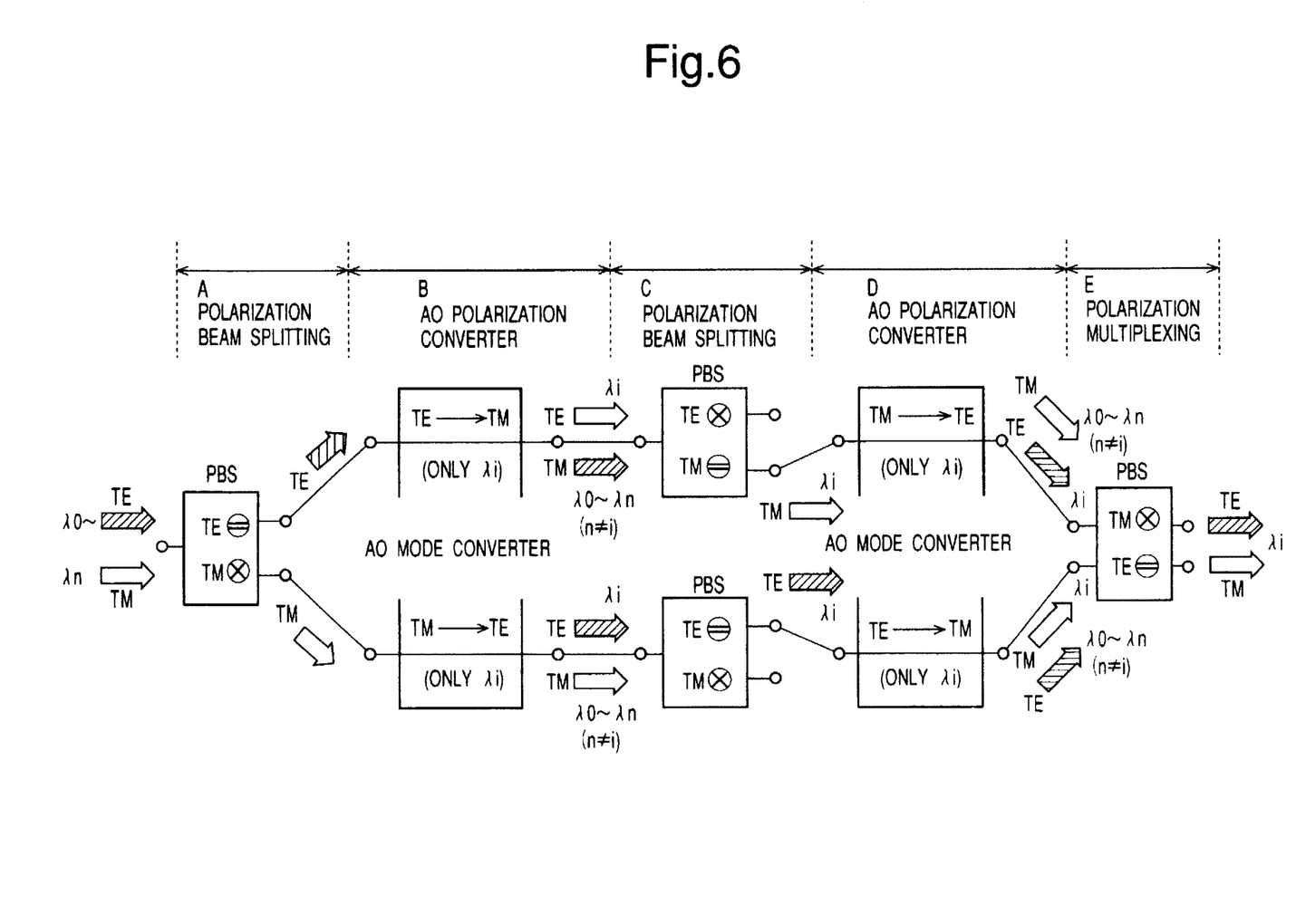
FIG. 6 is a diagram for illustrating conditions of the light in various parts for describing the principle of the optical filter shown in FIG. 5.

FIG. 6 is a diagram for illustrating conditions of the light in respective parts for describing the principle of the optical filter shown in FIG. 5. FIG. 6 is a schematic diagram for describing operations of AOTF shown in FIG. 5. A signal light supplied to the AOTF is split into TE wave (traverse electric mode) and TM wave (traverse magnetic mode) by the first polarization beam splitter, and only the specified wavelength component λi corresponding to the frequency supplied to the electrode 55 is converted from TE wave to TM wave and from TM wave to TE wave in the AO polarization converter. Next, polarization splitting, AO polarization conversion, and polarization splitting are repeated again, and finally only the wave-length component λi is taken out.

Figure 7:
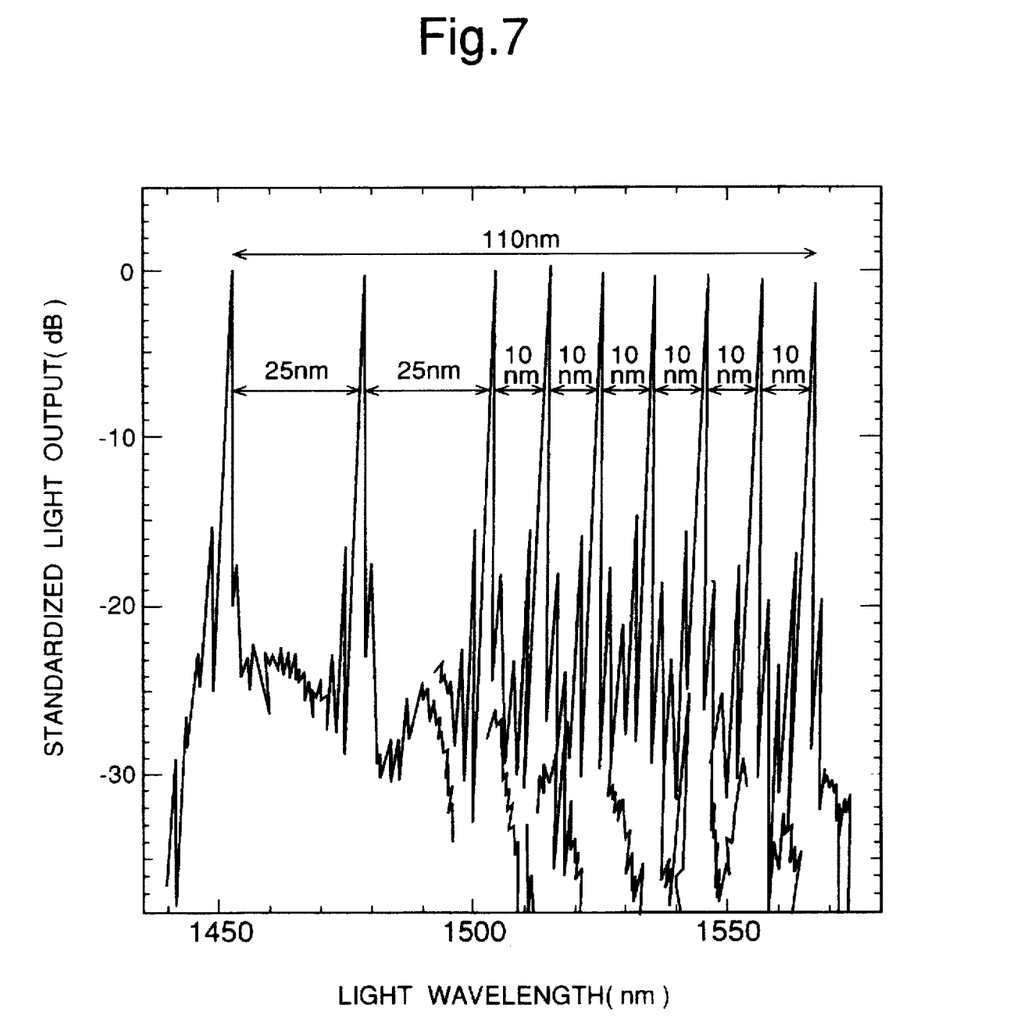
FIG. 7 is a chart for illustrating an example of the characteristics of the optical filter with transmission wavelength band controlling function in accordance with the present invention.

FIG. 7 is a diagram for describing the characteristics of the optical filter with transmission wavelength band controlling function in accordance with the present invention. The AOTF element used herein has AO polarization converter and two stages as shown in FIGS. 5 and 6, and therefore the stable filter characteristics is obtained regardless of polarization condition of the input signal light. In the case that the AOTF element is employed in the optical filter of the present invention, the driver 13 outputs a signal having the frequency which changes around 170 MHz dependently on the voltage supplied from the wavelength controller 9.

Figure 8:
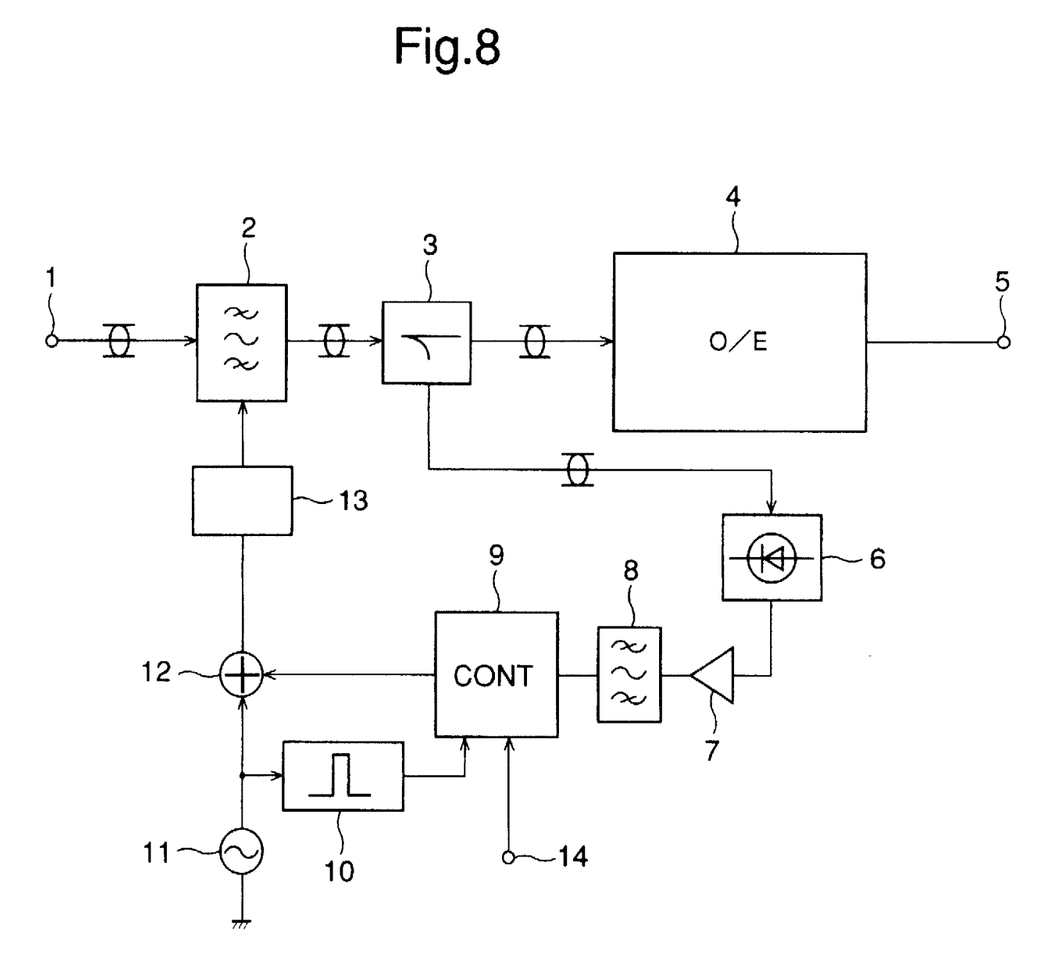
FIG. 8 is a diagram for illustrating the second embodiment of an optical filter with transmission wavelength band controlling function in accordance with the present invention.

Next, the second embodiment of an optical filter with transmission wavelength band controlling function in accordance with the present invention is described. FIG. 8 is a diagram for illustrating the structure of the second embodiment of an optical filter with transmission wavelength band controlling function in accordance with the present invention.

The optical filter shown in FIG. 8 has basically the same structure as that of the first embodiment of the present invention shown in FIG. 2. The second embodiment of the present invention is applied to the case that the input signal light is a multiplexed signal light which is formed by wavelength multiplexing signal lights having a plurality of different wavelengths. The second embodiment is provided with a channel selecting signal input terminal 14 for receiving a channel selecting signal for selecting a signal light having wavelength corresponding to the channel.

A selecting signal supplied from the channel selecting signal input terminal 14 is supplied to the wavelength controller 9. In the wavelength controller 9, a wavelength range of each wavelength channel is specified based on previously prescribed wavelength arrangement corresponding to the channel selecting signal. The center wavelength coincides with the signal light of a prescribed channel by restricting the variable range of the center wavelength of the transmission wavelength band of the optical filter 2.

As described herein above, according to the optical filter with transmission wavelength band controlling function in accordance with the present invention, sweeping for wavelength setting in the initial condition is needless. Therefore, the optical filter can be controlled within a short time. The optimal center wavelength of the transmission wavelength band can be always set optimal without sweeping again for temperature change or change with time.

Further, a signal light of a prescribed wavelength channel can be extracted based on the channel selecting signal for the wavelength multiplexed signal light.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical filter with transmission wavelength band controlling function provided with:

optical filter means for transmitting only the light having a wavelength included in the transmission wavelength band determined by a wavelength controller out of input signal light and for supplying a transmission wavelength band signal light;

low frequency signal generating means for generating a changing signal having a previously prescribed frequency;

light branching means for branching partially the said transmission wavelength band signal light and supplying a branched signal light from one terminal;

photoelectric conversion means for converting said branched signal light to an electric signal;

specific frequency signal component extracting means for extracting a signal component having said frequency of said changing signal from said electric signal and for supplying a specific frequency signal;

wavelength controlling means for detecting phase and amplitude of said specific frequency signal and for supplying a control signal so that said phase and amplitude is adjusted to previously prescribed values; and superposing means for superposing said changing signal to said control signal and for supplying said wavelength control signal to said optical filter means.

2. The optical filter with transmission wavelength band controlling function as claimed in claim 1, wherein said photoelectric converting means is provided with a light receiving element for receiving said branched signal light and for converting it to a current signal, and a current/voltage converter for converting said current signal to a voltage signal.

3. The optical filter with transmission wavelength band controlling function as claimed in claim 2, wherein the specific frequency signal component extracting means is provided with a filter for extracting said voltage signal having a previously prescribed specific frequency out of said voltage signal.

4. The optical filter with transmission wavelength band controlling function as claimed in claim 1, wherein said optical filter with transmission wavelength band controlling function is provided additionally with a pulse generating means for adding a pulse signal having the same period as that of said frequency to said changing signal and for supplying the pulsed changing signal to said control means.

5. The optical filter with transmission wavelength band controlling function as claimed in claim 4, wherein said control means is provided with a wavelength range setting means for controlling said transmission wavelength band within a previously prescribed wavelength range.

6. The optical filter with transmission wavelength band controlling function as claimed in claim 5, wherein said signal light is a wavelength multiplexed signal light that the signal light of a plurality of channels comprising different wavelengths respectively, and said wavelength range setting means sets said wavelength range based on the channel selecting signal supplied from the outside.

7. The optical filter with transmission wavelength band controlling function as claimed in claim 1, wherein said optical filter means is an acousto-optic optical filter.

8. The optical filter with transmission wavelength band controlling function as claimed in claim 7, wherein said acousto-optic optical filter contains:

the first polarization beam splitter for polarizing and splitting the input signal light and for supplying the first polarized and split light;

the first polarization converter for polarizing and converting said polarized and split light by way of acousto-optic effect and for supplying a polarized and converted light;

the second polarization beam splitter for polarizing and splitting said polarized converted light and supply the second polarized and split light;

the second polarization converter for polarizing and converting said first polarized and split light by way of acoustic-optic effect and supplying the second polarized and converted light;

a polarization multiplexer for polarization multiplexing said second polarized and converted light; and an electrode for applying a voltage signal based on said wavelength control signal to said first polarization converter and said second polarization converter.

9. The optical filter with transmission wavelength band controlling function as claimed in claim 8, wherein the frequency of said voltage signal is 170 MHz.

10. The optical filter with transmission wavelength band controlling function as claimed in claim 1, wherein said wavelength controller detects the deviation between the center wavelength of the transmission wavelength band of said optical filter and the center wavelength of said signal light based on said specific frequency signal extracted by said specific frequency signal component extracting means, and sets said wavelength control signal so that the said wavelength deviation is eliminated.

11. The optical filter with transmission wavelength band controlling function as claimed in claim 1, wherein said optical filter is additionally provided with receiving means connected to the other terminal of said light branching means for converting said transmission wavelength band signal light to an electric signal.

12. The optical filter with transmission wavelength band controlling function as claimed in claim 2, wherein said optical filter is additionally provided with a receiving means connected to the other terminal of said light branching means for converting said transmission wavelength band signal light to an electric signal.

13. The optical filter with transmission wavelength band controlling function as claimed in claim 5, wherein said optical filter is additionally provided with a receiving means connected to the other terminal of said light branching means for converting said transmission wavelength band signal light to an electric signal.

14. The optical filter with transmission wavelength band controlling function as claimed in claim 6, wherein said optical filter is additionally provided with a receiving means connected to the other terminal of said light branching means for converting said transmission wavelength band signal light to an electric signal.

* * * * *